United States Patent
Hogerheiden

(12) 
(10) Patent No.: US 9,859,992 B1
(45) Date of Patent: Jan. 2, 2018

(54) DYNAMIC RANGE EXTENDED INTERFERENCE CANCELER

(71) Applicant: Exelis Inc., Herndon, VA (US)

(72) Inventor: Gregory Deed Hogerheiden, Camarillo, CA (US)

(73) Assignee: Harris Corporation, Melbourne, FL (US)

( * ) Notice: Subject to any disclaimer, the term of this patent is extended or adjusted under 35 U.S.C. 154(b) by 152 days.

(21) Appl. No.: 14/879,584

(22) Filed: Oct. 9, 2015

(51) Int. Cl.
| | |
|---|---|
| *H04B 1/00* | (2006.01) |
| *H04B 15/06* | (2006.01) |
| *H04B 1/525* | (2015.01) |

(52) U.S. Cl.
CPC ............ *H04B 15/06* (2013.01); *H04B 1/525* (2013.01)

(58) Field of Classification Search
CPC ................................. H04B 15/06; H04B 1/525
USPC ....................................................... 455/63.1
See application file for complete search history.

(56) References Cited

U.S. PATENT DOCUMENTS

| | | | |
|---|---|---|---|
| 5,392,009 A | 2/1995 | Talwar | |
| 6,078,628 A * | 6/2000 | Griffith | H04L 27/361 330/285 |
| 7,671,720 B1 * | 3/2010 | Martin | G06K 19/0723 340/10.1 |
| 7,853,195 B2 | 12/2010 | Higgins | |
| 9,014,315 B1 | 4/2015 | Hogerheiden, Jr. et al. | |
| 2009/0325509 A1 * | 12/2009 | Mattisson | H04B 1/525 455/75 |
| 2010/0221998 A1 * | 9/2010 | Park | H04B 1/525 455/20 |
| 2012/0288039 A1 * | 11/2012 | Kim | H04L 27/3845 375/341 |

OTHER PUBLICATIONS

Rabindra N. Ghose, "Interference Mitigation—Theory and Application," The Institute of Electrical and Electronics Engineers, Inc., 1996, IEEE Press, New York.

* cited by examiner

*Primary Examiner* — Raj Chakraborty
(74) *Attorney, Agent, or Firm* — Edell, Shapiro & Finnan LLC

(57) ABSTRACT

A multi-tier interference canceler includes a first canceler, a second canceler, and a third canceler. The first canceler samples radio frequency (RF) interference generated from a linear signal using a non-linear process. The RF interference includes linear interference and non-linear interference. The first canceler cancels the linear interference from the sampled RF interference based on the linear signal to produce a first non-linear interference sample. The second canceler receives an amplitude scaled, time-shifted version of the RF interference and cancels the linear interference from the received RF interference based on the linear signal to produce a second non-linear interference sample. The third canceler cancels the non-linear interference from the second non-linear interference sample using the first non-linear interference sample, to produce a receive signal that is substantially free of the non-linear interference and the linear interference.

22 Claims, 9 Drawing Sheets

DYNAMIC RANGE EXTENDED INTERFERENCE CANCELER

FIELD OF THE INVENTION

The present disclosure relates to interference cancelers.

BACKGROUND

A high-power radio frequency (RF) transmitter may interfere with an RF receiver located nearby, for example, where the transmitter and receiver are co-located on the same platform. Such interference is referred to as co-site interference. Co-site interference cancelers attempt to suppress both high-level interference and low-level interference in the form of noise, spurious, and other artifacts that result from non-linearity in the transmitter. Because of the very high dynamic range, e.g., 90 dB, required to cancel both the high-level and the low-level interference, conventional cancelers use complex, expensive, and bulky analog cancellation techniques to achieve some degree of broadband cancellation of the high-level interference. Conventional, cost effective, analog-to-digital converters (ADCs) cannot handle the high dynamic range, which makes digital cancellation stages more difficult to implement.

SUMMARY

A multi-tier interference canceler includes a first canceler, a second canceler, and a third canceler. The first canceler samples radio frequency (RF) interference generated from a linear signal using a non-linear process. The RF interference includes linear interference and non-linear interference. The first canceler cancels the linear interference from the sampled RF interference based on the linear signal to produce a first non-linear interference sample. The second canceler receives an amplitude scaled, time-shifted version of the RF interference and cancels the linear interference from the received RF interference based on the linear signal to produce a second non-linear interference sample. The third canceler cancels the non-linear interference from the second non-linear interference sample using the first non-linear interference sample, to produce a receive signal that is substantially free of the non-linear interference and the linear interference.

DETAILED DESCRIPTION

Figure 1:
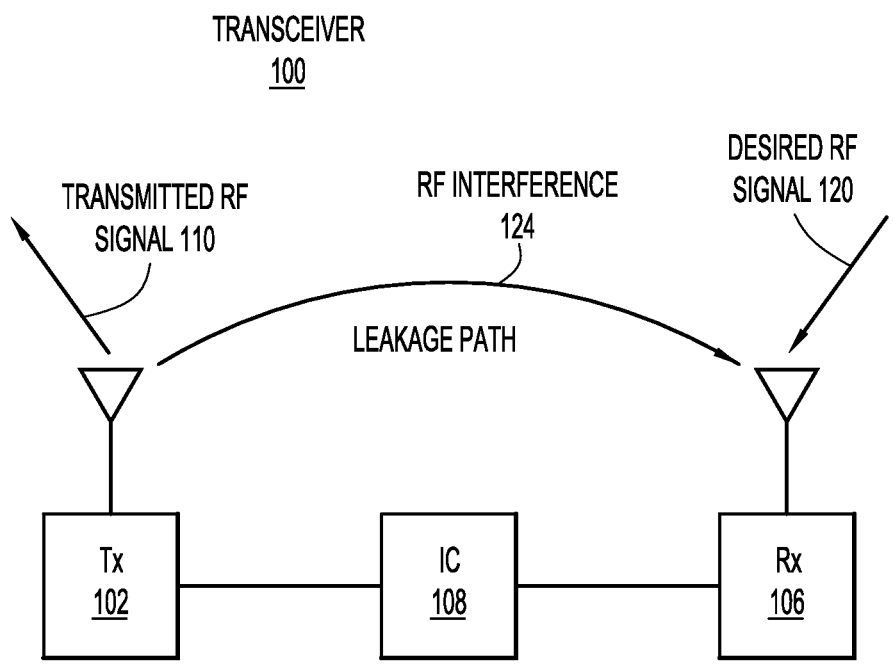
FIG. 1 is a block diagram of an example transmitter (TX)/receiver (RX) system (i.e., transceiver) in which an interference canceler as described herein may be implemented.

With reference to FIG. 1, there is depicted a block diagram of an example transmitter (TX)/receiver (RX) system 100 (also referred to as a transceiver 100) in which techniques describe herein may be implemented. System 100 includes a transmitter 102, a receiver 106, and an interference canceler (IC) 108 coupled with the receiver and the transmitter. Transmitter 102 and receiver 106 may be situated relatively close to each other, for example, co-located with each other on a transceiver platform, but are otherwise operated independently for purposes of transmitting signals to intended destinations and receiving desired signals.

In operation, transmitter 102 transmits radio frequency (RF) energy 110 that typically includes relatively high-level (i.e., high-power) narrowband (i.e., narrow bandwidth) linear RF signals generated by linear systems/processes in the transmitter and relatively low-level (i.e., low-power) wideband (i.e., wide bandwidth) non-linear RF signals including noise, harmonic spurs, and non-harmonic spurs generated as by products of non-linear systems/processes in the transmitter. Transmitted RF energy 110 is not generally intended for receiver 106. Instead, receiver 106 receives a desired RF signal 120 having a frequency anywhere within an RF frequency range of the receiver. The frequency range of receiver 106 typically encompasses frequencies present in transmitted RF energy 110.

Depending on the proximity of transmitter 102 to receiver 106, a substantial portion of transmitted RF energy 110 may find its way to receiver 102 via a wireless RF leakage path between the transmitter and the receiver to become undesired RF interference 124 at the receiver. In other words, the relatively high-level narrowband linear signals and the low-level wideband non-linear signals of transmitted RF energy 110 respectively become high-level narrowband linear interference and low-level wideband non-linear interference at receiver 106 (as presented in RF interference 124). As a result, receiver 106 receives/captures composite RF energy that includes desired RF signal 120 as well as undesired RF interference 124. In many instances, a level of desired RF signal 120 at receiver 106 may be substantially lower than the leakage levels of RF interference 124 at the receiver. Also, RF 124 interference may overdrive or even damage components in receiver 106. Thus, it is desirable (or perhaps necessary) to cancel RF interference 124 from the composite RF energy in receiver 106 in order to recover desired signal 120 more cleanly. Accordingly, interference canceler 108 cancels RF interference 124 from the composite RF energy received at receiver 106. Interference canceler 108 includes multiple stages or tiers of cancellation to cancel separately the high-level narrowband linear interference and the low-level wideband non-linear interference from RF interference 124.

As mentioned above, linear and non-linear systems/processes in transmitter 102 generate linear and non-linear RF signals, respectively. These systems/processes are described briefly. Generally, a non-linear system/process is one having a non-linear response such that a relationship of an input signal to an output signal of the non-linear system changes as a function of a level of the input signal. An example of a non-linear system includes an amplifier that exhibits a different amount of gain for low signal levels or voltages than for high signal levels or voltages due to compression.

When two or more original signals of unequal frequency are passed through and processed by the non-linear system/process, the non-linear system/process causes amplitude modulation of the signals. As a result, the non-linear system/process produces at its output the original signal frequencies (i.e., input frequencies) as well as harmonics at integer multiples of the input frequencies. Additionally, the non-linear system/process produces intermodulation distortion products that appear at arbitrary integer combinations of the input frequencies. Signals at/having the original/input frequencies are referred to as "linear signals," and the intermodulation and harmonic distortion products and noise generated by the non-linear response/process are referred to as "non-linear signals." Interference canceler 108 cancels the linear and non-linear signals generated by transmitter 102 within a frequency bandwidth of the interference canceler.

Figure 2:
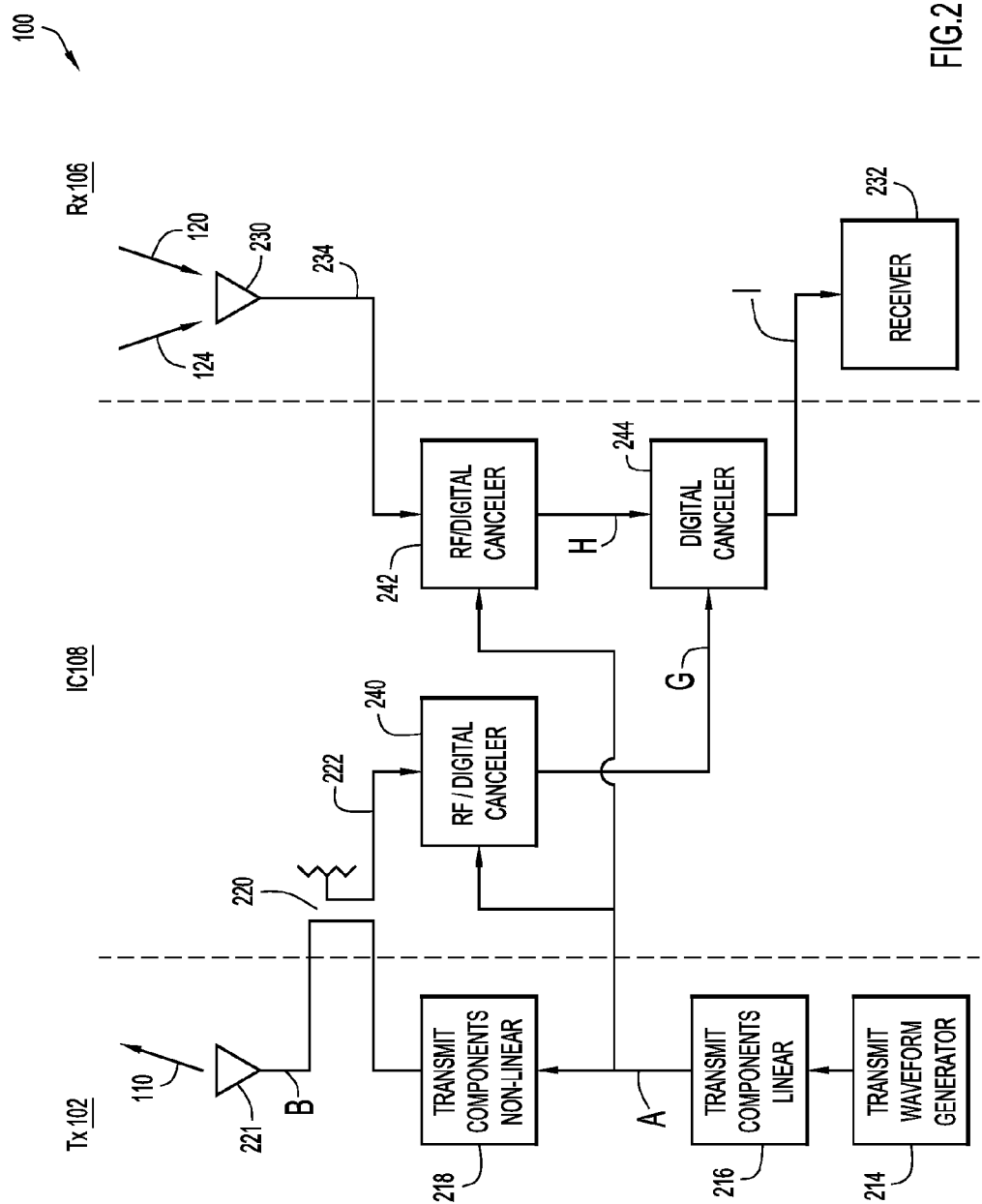
FIG. 2 is a block diagram of the transceiver of FIG. 1, including a multi-tier interference canceler, according to an embodiment.

With reference to FIG. 2, there is depicted a detailed block diagram of transceiver/system 100, according to an embodiment. FIG. 2 is described also with reference to FIGS. 3A-3I. FIGS. 3A-3I are illustrations of example frequency spectrums (i.e., frequency vs. amplitude plots) of signals and interference introduced in FIG. 2 via reference labels corresponding to the reference labels of the figures. For example, a signal "A" introduced in FIG. 2 has a frequency spectrum illustrated in FIG. "3A," a signal "B" introduced in FIG. 2 has a frequency spectrum illustrated in FIG. "3B," and so on.

Figure 3C:
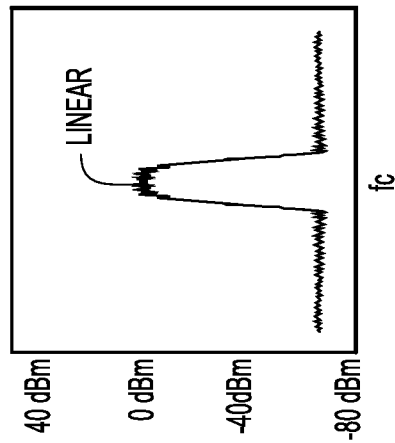
FIGS. 3A-3I are illustrations of example frequency spectrums (i.e., frequency vs. level/amplitude plots) of transceiver signals and interference introduced in FIGS. 2 and 4.
Figure 3B:
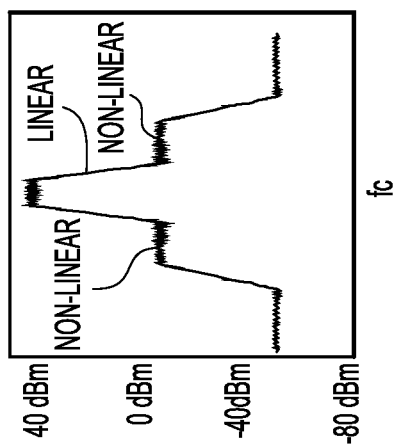
Figure 3A:
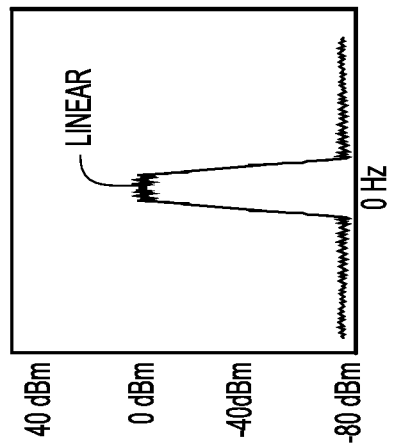

On the left-hand side of FIG. 2, TX 102 includes a transmit waveform generator 214, first transmit components 216, second transmit components 218, an RF coupler 220 that is shared with IC 108, and a TX antenna 221. Waveform generator 214 generates a low-level, low-frequency signal or waveform, such as a modulated signal to be transmitted by TX 102, and provides the waveform to first transmit components 216. First transmit components 216 have a linear system response and process the low-level, low-frequency waveform to produce a low-level, low-frequency, narrowband linear signal A, and provide linear signal A to second transmit components 218 and IC 108. In an example, first transmit path components 216 may scale an amplitude of the waveform from waveform generator 214 to produce linear signal A. As depicted in FIG. 3A, linear signal A is a relatively high-level, narrowband signal centered at baseband (i.e., 0 Hz). Alternatively, signal A may be centered at an intermediate frequency (IF) that is typically below the RF frequency of transmit RF energy 110.

Second transmit components 218 have a non-linear system response and process linear signal A to produce a high-level, high-frequency (e.g., RF), wideband non-linear signal B having both linear and non-linear signals therein, and provide signal B to coupler 220 and TX antenna 221. For example, second transmit components 218 frequency up-convert and amplify linear signal A to produce non-linear signal B. As depicted in FIG. 3B, non-linear signal B is a composite signal that includes (i) a high-level, narrowband linear signal centered at a carrier frequency fc and representative of the baseband (or IF) linear signal A shifted to frequency fc, and (ii) low-level, wideband non-linear signals straddling the linear signal and having lower power levels than that of the linear signal. In an example, frequency fc may be several hundred MHz or several GHz. RF coupler 220 provides an RF sample of signal B (represented at 222) to IC 108. TX antenna 221 radiates signal B as RF transmit energy 110 and RF interference 124, in which the linear signal linear interference and the non-linear signals represent non-linear interference.

Figure 3F:
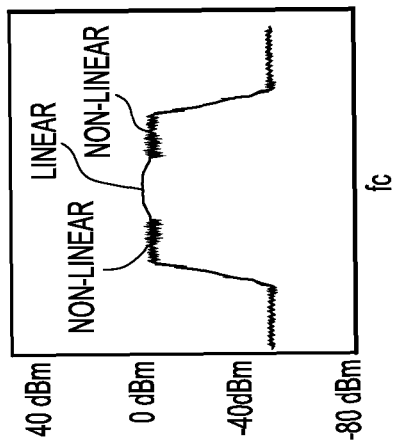
Figure 3E:
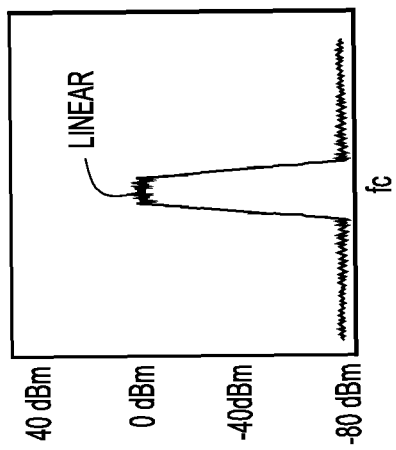

On the right-hand side of FIG. 2, RX 106 includes an RX antenna 230 and a receiver 232 (i.e., receiver components) each coupled to IC 108. RX antenna 230 captures and delivers RF energy 234, including interference 124 together with any desired signals, to IC 108. IC 108 cancels interference 124 from RF energy 234 (also referred to as "received RF 234"), to produce a signal I from which the interference has been canceled. Signal I includes the desired signals free of interference. IC 108 delivers signal I to receiver 232. As depicted in FIG. 3I, signal I is substantially free from the linear interference and the non-linear interference corresponding to the linear and non-linear signals in RF energy 110 (and RF interference 124).

IC 108 is a multi-tier IC canceler that includes a first first tier IC canceler 240 coupled with TX 102, a second first tier IC canceler 242 coupled with RX 106, and a second tier (IC) canceler 244 also coupled with RX 106. The term "IC canceler" is referred to herein as simply "canceler." Also, in the embodiment of FIG. 2, first and second first tier cancelers 240 and 242 each operate in both an RF domain and a digital domain, and are each referred to as an "RF/Digital Canceler." First and second first tier cancelers 240 and 242 each cancel linear interference in the RF and digital domain to produce samples (i.e., signals) of non-linear interference, and second tier canceler 244 cancels the non-linear interference in the digital domain using the samples, as will be described more fully below.

First tier canceler 240 receives linear signal A and RF sample 222 including the linear interference and the non-linear interference therein. The linear and non-linear signals in RF signal B and RF energy 110 are also referred to herein as linear and non-linear interference because of their interfering effect on RX 102. First tier canceler 240 cancels substantially all of the linear interference from RF sample 222 based on linear signal A, to produce a non-linear interference sample G. As depicted in FIG. 3G, non-linear interference sample G has a frequency spectrum from which the linear interference has been substantially canceled, leaving only the non-linear interference.

Second first tier canceler 242 receives linear signal A and received RF 234, including the linear interference and the non-linear interference therein. Second first tier canceler 242 cancels substantially all of the linear interference from received RF 234 based on linear signal A, to produce a non-linear interference sample H, which also includes the desired signals that are present in received RF 234. As depicted in FIG. 3H, non-linear interference sample H has a frequency spectrum similar to that of non-linear interference sample G. Thus, linear signal A serves as a linear reference for each of first tier cancelers 240 and 242.

Second tier canceler 244 receives non-linear interference sample G and non-linear interference sample H. Second tier canceler 244 cancels the non-linear interference from non-linear interference sample H using non-linear interference sample G, to produce signal I. Signal I includes the desired signals present in non-linear interference sample H (from received RF 234), substantially free of both linear interference and non-linear interference, as depicted in FIG. 3I.

Figure 3D:
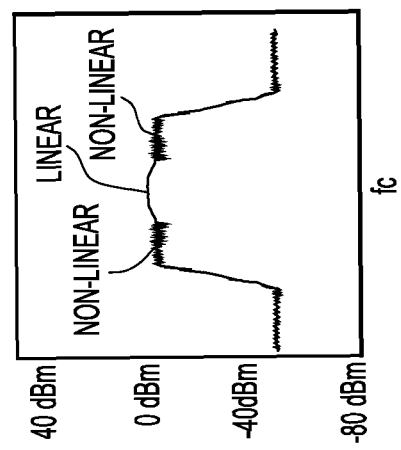
Figure 3I:
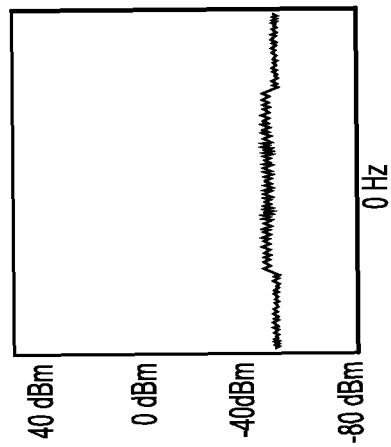
Figure 3H:
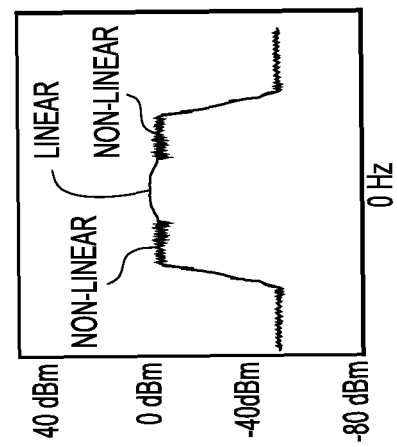
Figure 3G:
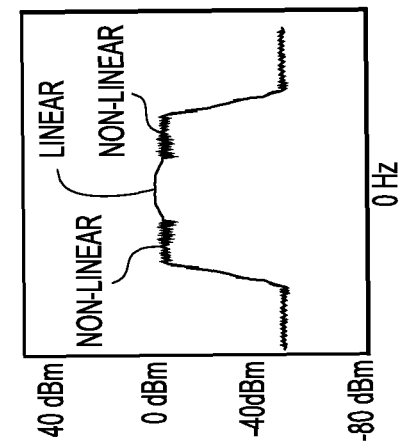
Figure 4:
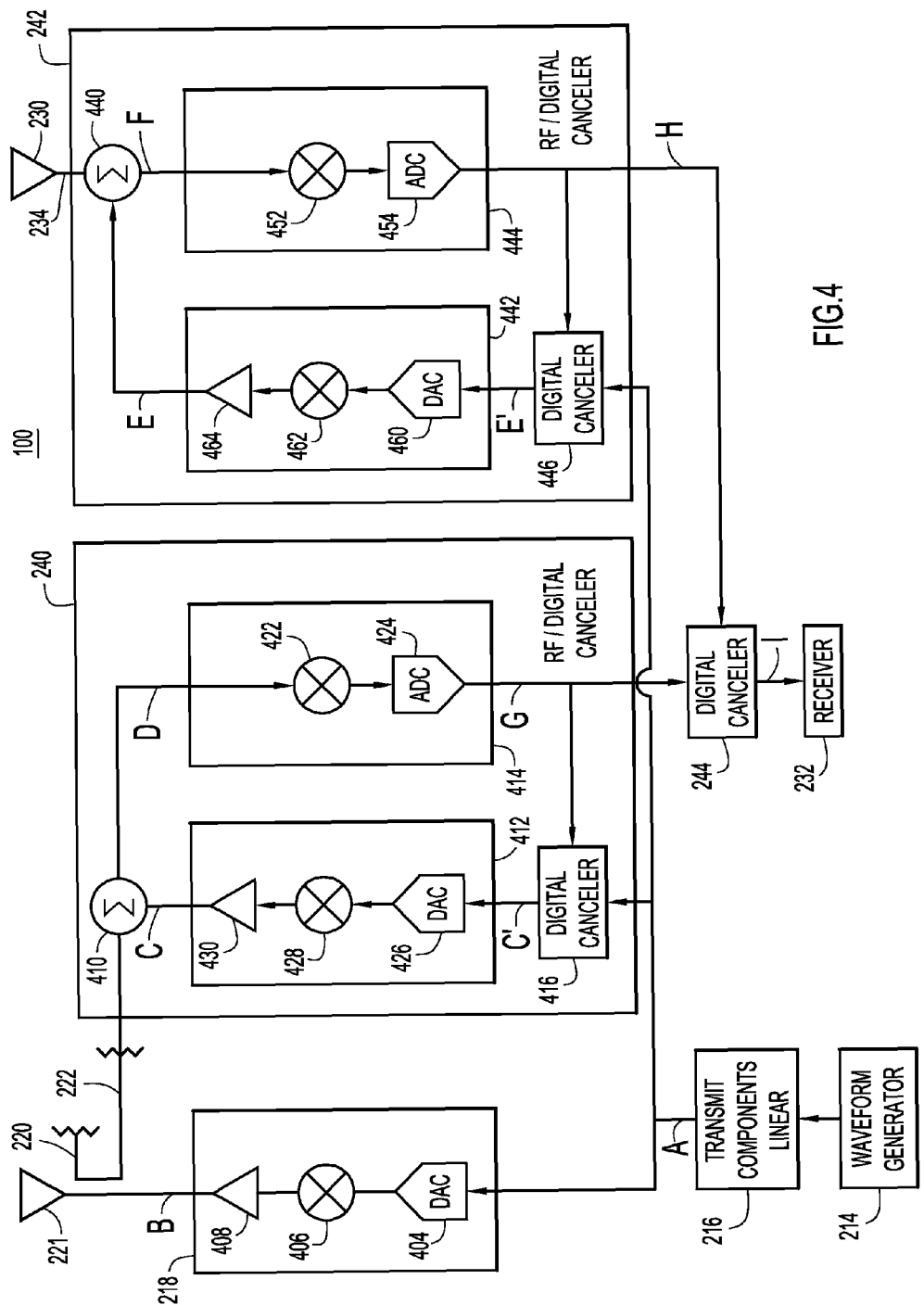
FIG. 4 is a detailed block diagram of the transceiver, including the multi-tier canceler, of FIG. 2, according to an embodiment.

With reference to FIG. 4, there is a more detailed block diagram of transceiver 100, according to an embodiment. FIG. 4 is described also with reference to the plots of FIGS. 3A-I. In the example of FIG. 4, in TX 102, first transmit components 216 generate signal A as a digitized (i.e., digital) baseband signal having a frequency spectrum centered at 0 Hz, or, alternatively, a digitized intermediate frequency (IF) signal centered at a frequency above baseband but below the center frequency fc of RF signal B (e.g., at an IF of several hundred KHz or several MHz). Second transmit components 218 include, in series, a digital-to-analog converter (DAC) 404 to convert signal A to an analog signal, a mixer 406 to frequency up-convert the analog signal from baseband or IF to RF frequency fc, and an amplifier 408 to amplify the resulting analog, up-converted signal, to produce RF signal B.

In the example of FIG. 4, first first tier canceler 240 (RF/Digital Canceler 240) includes an RF summer 410, a frequency up-converter 412, a frequency down-converter 414, and a digital canceler 416 configured to operate together in a feedback loop to cancel the linear interference (i.e., linear signal) from RF sample 222. In the feedback loop, frequency up-converter 412 provides to RF summer 410 a linear RF canceling signal C that is substantially equal in frequency and amplitude, and opposite in phase from, the linear signal/interference in the RF sample 222. With reference to FIG. 3C, RF canceling signal C includes an RF linear signal centered at frequency fc used' to cancel the linear signal in RF sample 222. RF summer 410 combines RF sample 222 with RF canceling signal C to produce an RF signal D substantially free of the linear interference and therefore representative of the non-linear interference in RF sample 222.

As depicted in FIG. 3D, RF signal D represents an RF version (centered at frequency fc) of linear interference sample G. Frequency down-converter 414 includes a mixer 422 to frequency down-convert the RF signal D to either a baseband or an IF signal commensurate with baseband or IF linear signal A, respectively, and an analog-to-digital converter (ADC) 424 to digitize the frequency down-converted baseband or IF signal, to produce non-linear interference sample G as a digitized baseband or IF signal. Canceling the relatively high-power linear interference at RF summer 410 prior to ADC 424 reduces the required dynamic range of the ADC and thereby significantly reduces the cost and size of the ADC.

Digital canceler 416 operates in the digital domain, i.e., on digitized signals, to cancel residual linear interference in digitized linear interference sample G based on digitized linear signal A, to produce a digitized linear baseband or IF (i.e., low frequency) canceling signal C'.

Frequency up-converter 412 includes a DAC 426 to convert digitized IF canceling signal C' to an analog signal, a mixer 428 to frequency up-convert the analog signal to an RF frequency band that matches or is equal to that of RF sample 222, and an amplifier 430 to amplify the frequency up-converted signal to produce RF canceling signal C.

In the example of FIG. 4, second first tier canceler 242 (RF/Digital Canceler 242) includes an RF summer 440, a frequency up-converter 442, a frequency down-converter 444, and a digital canceler 446 configured to operate together in a feedback loop to cancel linear interference from received RF 234. Second first tier canceler 242 is configured and operates similarly to first first tier canceler 240. In the feedback loop of second first tier canceler 242, frequency up-converter 442 provides to RF summer 440 a linear RF canceling signal E that is substantially equal in frequency and amplitude, and opposite in phase from, the linear interference in received RF signal 234. As depicted in FIG. 3E, linear RF canceling signal E has a frequency spectrum substantially the same as that of linear RF canceling signal C. RF summer 440 combines received RF 234 with RF canceling signal E to produce an RF signal F substantially free of the linear interference and therefore representative of the non-linear interference in received RF 234. As depicted in FIG. 3F, RF signal F represents an RF version of non-linear interference sample H.

Frequency down-converter 444 includes a mixer 452 and an ADC 454 to frequency down-convert and then digitize RF signal F to produce non-linear interference sample H in digitized form at either baseband or IF.

Digital canceler 446 operates in the digital domain to cancel residual linear interference in digitized linear interference sample H based on digitized linear signal A, to produce a digitized linear baseband or IF (i.e., low frequency) canceling signal E'.

Frequency up-converter 442 includes a DAC 460 to convert digitized IF canceling signal E' to an analog signal, a mixer 462 to frequency up-convert the analog signal to an RF frequency band that matches or is equal to that of received RF 234, and an amplifier 464 to amplify the frequency up-converted signal to produce RF canceling signal E.

Interference canceler 244 operates in the digital domain to cancel the non-linear interference from interference sample H based on the non-linear interference sample G, to produce signal I.

In the example above, RF signals/interference 110, 124, B, C, E, D, and F are each in a high frequency band, e.g., an RF frequency band. In contrast, signals/interference A, G, H, I, C', and E' are each in a low frequency band, which may be centered at baseband or, alternatively, an intermediate frequency typically below the RF band. Also, the frequency up and down conversions are performed based on local oscillator signals not shown in the FIGs., as would be appreciated to one of ordinary skill in the relevant arts. In an embodiment that uses high bandwidth/fast ADCs and DACs (e.g., for ADC 424 and DACs 426 and 460) capable of directly converting between the above-described digitized signals and analog signals at the RF and IF frequencies, the frequency up-conversion and frequency down-conversion described above may be omitted. Also, in an embodiment in which signal A is an analog/continuous-time signal, digital cancelers 244, 416, and 446 may be implemented fully or in part in an analog domain using analog components that process analog signals.

Figure 5:
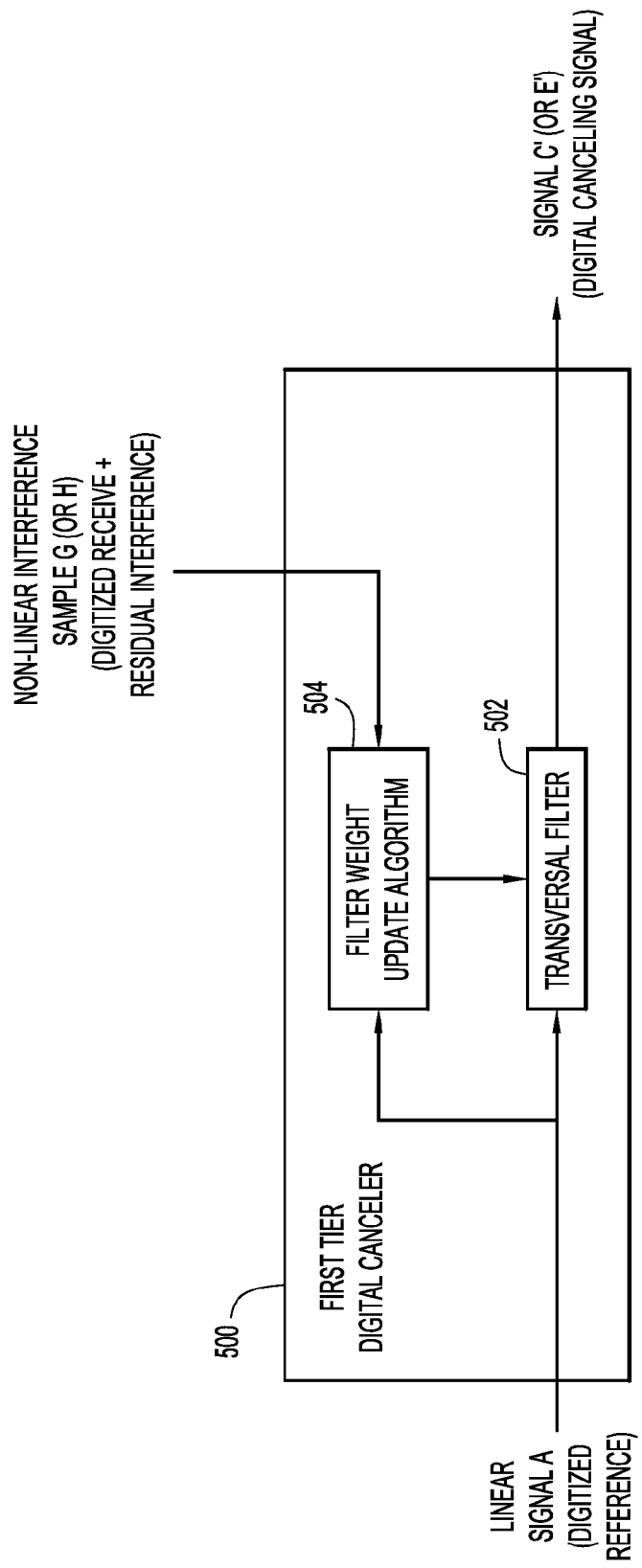
FIG. 5 is a block diagram of a first tier digital canceler of the multi-tier canceler, according to an embodiment.

FIG. 5 is a block diagram of a first tier digital canceler 500 representative of each of digital cancelers 416 and 446, according to an embodiment. All of the components/modules (i.e., digital logic) of digital canceler 500 depicted in FIG. 5 are digital components/modules that perform digital signal processing of respective digital signals. Also, all of the components/modules of digital canceler 500 depicted in FIG. 5 may perform quadrature digital signal processing, i.e., the components/modules operate on both I and Q components of their respective signals.

Digital canceler 500 includes a transversal filter 502 and a filter weight update algorithm/module 504. Filter weight update module 504 adjusts a set of adaptive filter weights based on linear signal A and non-linear interference sample G (or H), and provides the filter weights to transversal filter 502. Transversal filter 502 filters signal A to produce baseband or IF canceling signal C' (or E') based on the filter weights such that the canceling signal is substantially equal in amplitude to and opposite in phase from the residual linear interference in non-linear interference sample G (or H). Transversal filter 502 may be implemented in accordance with any of a number of different algorithms, such as, but not limited to, Least Mean Square, Recursive Least Squares, Gram-Schmidt, and Sample Matrix Inversion.

Figure 6:
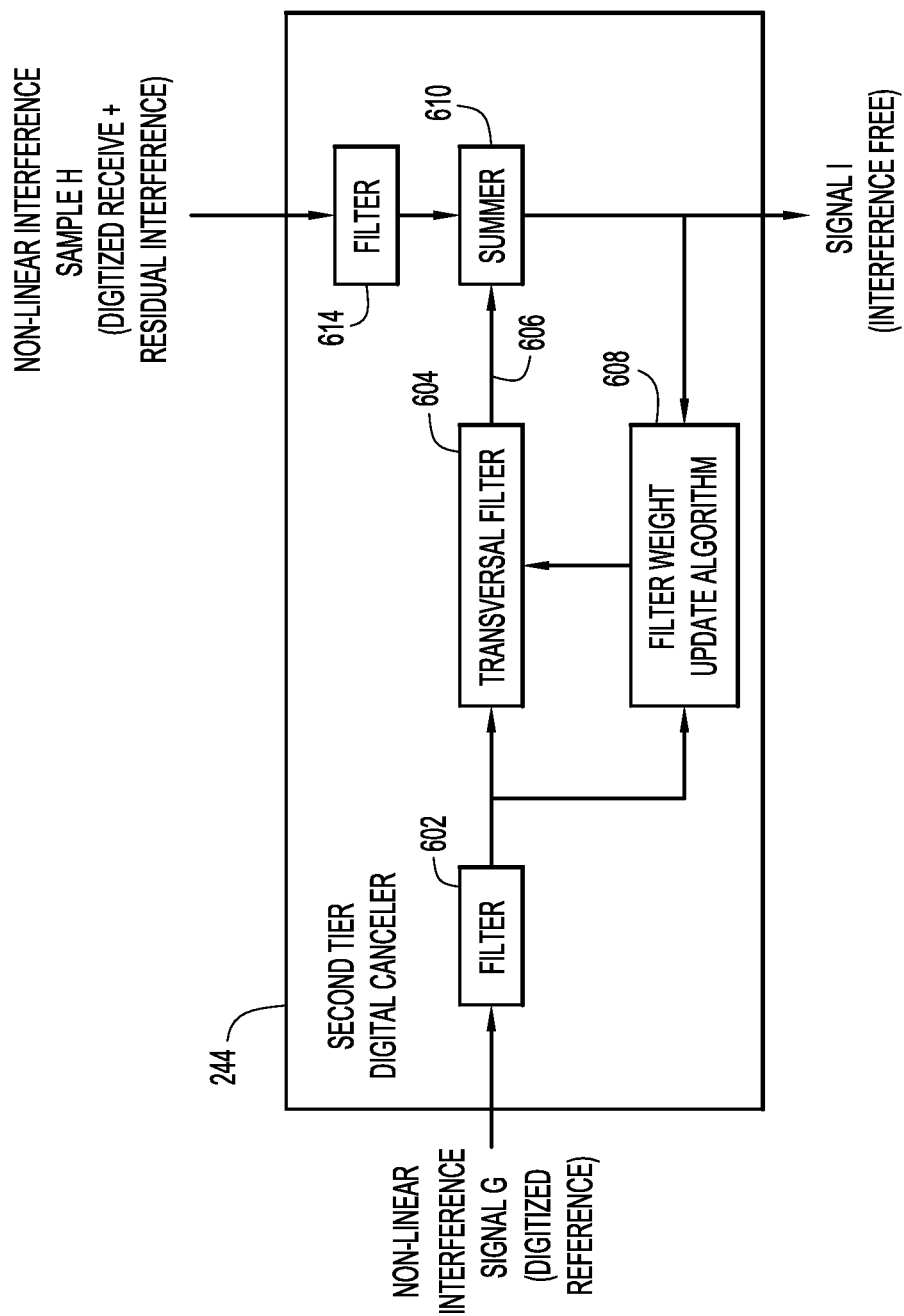
FIG. 6 is a block diagram of a second tier digital canceler of the multi-tier canceler, according to an embodiment.

FIG. 6 is a block diagram of second tier digital canceler 244, according to an embodiment. All of the components/ modules (i.e., digital logic) of digital canceler 244 are digital components/modules that perform digital signal processing of respective digital signals, and may perform quadrature digital signal processing, i.e., the components/modules operate on both I and Q components of their respective signals. Digital canceler 244 includes a low pass filter (LPF) 602 to low-pass filter non-linear interference sample G. A transversal filter 604 derives a correction signal 606 substantially equal in amplitude to and opposite in phase from interference components in the non-linear interference represented in the low-pass filtered version of non-linear interference sample G (from LPF 602) based on multi-tap adaptive filter coefficients derived by a filter weight update module 608, and provides correction signal 606 to summer 610. An LPF 614 filters non-linear interference sample H to produce a filtered version thereof, and summer 610 sums correction signal 606 with the filtered version of sample H, to produce output I substantially free of all interference. Summer 610 also provides a portion of output I to filter weight update module 608, which derives the filter coefficients based on this feedback and a reference sample of the low-pass filtered version of non-linear interference sample G (from LPF) 602.

Figure 7:
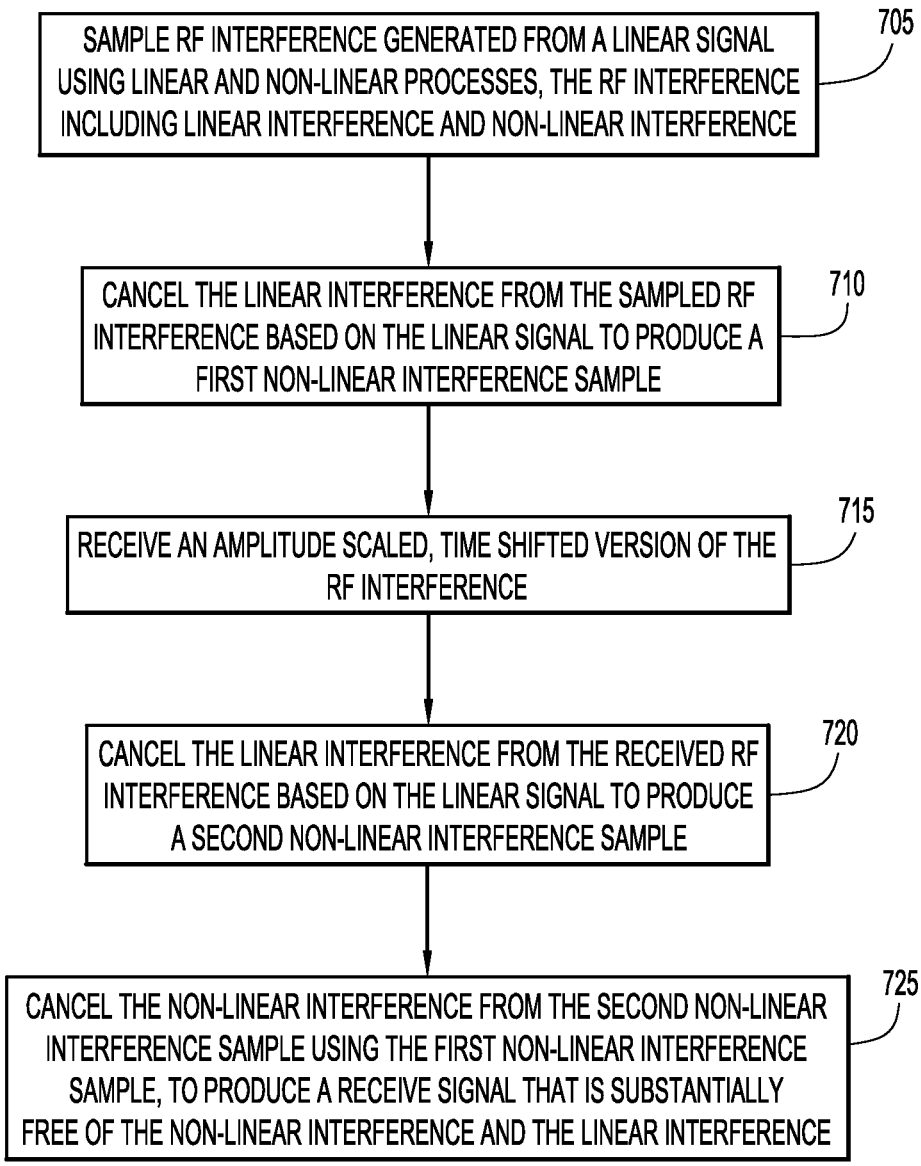
FIG. 7 is a flowchart of an example method of canceling interference in the multi-tier interference canceler.

With reference to FIG. 7, there is depicted a flowchart an example method 700 of canceling relatively high-level narrowband linear interference and relatively low-level wideband non-linear interference from RF energy originated at TX 102, performed by interference canceler 108.

At 705, coupler 220 samples RF interference (represented in RF signal B) generated from a linear signal A using linear and non-linear processes in transmit components 216 and 218, respectively. Signal 222 represents the sampled RF interference, which includes linear interference and non-linear interference.

At 710, first first tier canceler 240 cancels the linear interference from the sampled RF interference (from 705) based on linear signal A to produce first non-linear interference sample G.

At 715, RX 106 receives RF interference 124 as an amplitude scaled, time shifted version of the RF interference radiated from TX antenna 221. RX 106 also receives any desired signals at 715.

At 720, second first tier canceler 242 cancels the linear interference from the received RF interference (from 715) based on linear signal A to produce second non-linear interference sample H, which also includes any desired signals also received at 715.

At 725, second tier canceler 244 cancels the non-linear interference from non-linear interference sample H using non-linear interference sample G, to produce receive signal I (including any desired signals) substantially free of the non-linear interference and the linear interference.

In summary, interference canceler/canceling embodiments presented herein invention overcome difficulties encountered when canceling high power, wideband interference and recovering low level signals of interest in a receiver, while remaining adaptive to a (potentially) changing multipath environment. The embodiments employ a multi-tier cancellation technique where the first tier generates a wideband cancellation signal, generated by digitally processing a sample of a digital baseband signal driving an interfering transmit channel, and that is converted to RF through a DAC (and if needed a frequency agile up-converter), and summed with an RF receive input to provide cancellation of linear components of the interference. Residual linear components and non-linear components of the interference (due to transmit chain compression and other transmit chain non-linearities) are sampled by an ADC and cancelled by a second-tier, fully digital, interference canceller. In order to provide an adequate reference signal for the second tier canceller, a reference conditioner section (RF/Digital Canceler) is included that removes the linear components of sampled reference at an output of a transmit chain in the transmitter (in the same way the first tier interference canceller removed the linear components of interference from the RF receive path) so that a sampled reference of the non-linear components can be obtained. In the example approach described above, all signal conditioning (i.e. vector modulation and time domain processing) is implemented in Digital Signal Processing (DSP) and the RF hardware components are limited to the conversion hardware and summers. In other example approaches, the above described time domain processing implemented in DSP blocks may be formed in part or fully in an analog domain using analog circuitry, which operates on analog or continuous time signals.

Both the high level linear components of the interference and low level broadband noise and non-linear components can be removed by the multi-tier cascade canceler leaving only the desired receive signals. Thus, interference canceler/canceling embodiments herein extend the dynamic range of a digital interference canceller while overcoming the limitations of conventional technologies; that is, the embodiments can handle a varying antenna-to-antenna transfer function because they are fully adaptive, they can suppress signals over a wide bandwidth without a significant growth in RF hardware because all the taps are implemented digitally, they can remove co-channel interference because they do not rely on filters but rather on adaptive interference cancellation, and they can handle high-power interferers because the high-power linear components of the interferer are removed before analog-to-digital sampling.

Embodiments presented herein realize significant size, weight, power, and cost savings because they leverage a digital version of the transmitted interference to remove the linear components of the interference from both a reference sample and the receive path in order to reduce the total power seen by ADCs. An advantage of performing canceler signal processing digitally is that transversal filters can be realized using DSP blocks, allowing for many more degrees of freedom (or weights) and consequently a much deeper and broader bandwidth cancellation solution in a much smaller package than could be realized with analog components.

In summary, in one form, a method is provided comprising: sampling radio frequency (RF) interference generated from a linear signal by a non-linear process, the RF interference including linear interference and non-linear interference; first canceling the linear interference from the sampled RF interference based on the linear signal to produce a first non-linear interference sample; receiving an amplitude scaled, time shifted version of the RF interference; second canceling the linear interference from the received RF interference based on the linear signal to produce a second non-linear interference sample; and third canceling the non-linear interference from the second non-linear interference sample using the first non-linear interference sample, to produce a receive signal that is substantially free of the non-linear interference and the linear interference.

In another form, an apparatus is provided comprising: a first canceler to: sample radio frequency (RF) interference generated from a linear signal using a non-linear process, the RF interference including linear interference and non-linear interference; and cancel the linear interference from the sampled RF interference based on the linear signal to produce a first non-linear interference sample; a second canceler to: receive an amplitude scaled, time shifted version of the RF interference; and cancel the linear interference from the received RF interference based on the linear signal to produce a second non-linear interference sample; and a third canceler to cancel the non-linear interference from the second non-linear interference sample using the first non-linear interference sample, to produce a receive signal that is substantially free of the non-linear interference and the linear interference.

In another form, a system is provided comprising: a transmitter to transmit radio frequency (RF) interference generated from a linear signal using a non-linear processes, the RF interference including linear and non-linear interference; a receiver to receive a portion of the transmitted interference; and a multi-tier canceler coupled with the receiver and the transmitter, including: a first canceler to sample the generated interference including linear interference and non-linear interference, and cancel the linear interference from the sampled RF interference based on the linear signal to produce a first non-linear interference sample; a second canceler to receive an amplitude scaled, time shifted version of the RF interference, and cancel the linear interference from the received RF interference based on the linear signal to produce a second non-linear interference sample; and a third canceler to cancel the non-linear interference from the second non-linear interference sample using the first non-linear interference sample, to produce a receive signal that is substantially free of the non-linear interference and the linear interference, and provide the receive signal to the receiver.

Although the apparatus and method are illustrated and described herein as embodied in one or more specific examples, it is nevertheless not intended to be limited to the details shown, since various modifications and structural changes may be made therein without departing from the scope of the apparatus and method and within the scope and range of equivalents of the claims. Accordingly, it is appropriate that the appended claims be construed broadly and in a manner consistent with the scope of the apparatus and method as set forth in the following claims.

What is claimed is:

1. A method, comprising:
   sampling radio frequency (RF) interference generated from a linear signal by a non-linear process, the RF interference including relatively narrow-band linear interference and relatively wideband non-linear interference;
   receiving from a transmitter the linear signal;
   first canceling in an analog domain the narrow-band linear interference from the sampled RF interference, wherein the first canceling includes summing the sampled RF interference with a linear RF canceling signal that is based on the linear signal, to produce a wideband first non-linear interference sample in a digital domain:
   receiving an amplitude scaled, time shifted version of the RF interference;
   second canceling in the analog domain the narrow-band linear interference from the received RF interference based on the linear signal to produce a wideband second non-linear interference sample in the digital domain; and
   third canceling in the digital domain the wideband non-linear interference from the wideband second non-linear interference sample using the wideband first non-linear interference sample, to produce a receive signal that is substantially free of the non-linear interference and the linear interference.

2. The method of claim 1, wherein the first canceling includes:
   deriving the linear RF canceling signal from the linear signal and the first non-linear interference sample so that the linear RF canceling signal is substantially equal in amplitude and opposite in phase from the linear interference in the RF interference sample,
   wherein the summing substantially cancels the linear interference from the sampled RF interference.

3. The method of claim 2, wherein the RF interference and the linear RF canceling signal are in a high-frequency band and the linear signal is in a low-frequency band below the high-frequency band, the summing produces an RF version of the first non-linear interference sample, and the first canceling further includes:
   down-converting to the low-frequency band the RF version of the first non-linear interference sample to produce the first non-linear interference sample;
   generating in the low-frequency band a linear low-frequency canceling signal from the linear signal and the first non-linear interference sample; and
   up-converting the linear low-frequency canceling signal to the linear RF canceling signal.

4. The method of claim 3, wherein the linear signal is a digitized linear signal:
   the down-converting includes frequency down-converting to the low-frequency band and then digitizing the RF version of the first non-linear interference sample, to produce the first non-linear interference sample as a digitized, non-linear interference sample in the low-frequency band; and
   the generating includes digitally generating the linear low-frequency canceling signal as a digitized linear low-frequency canceling signal based on the digitized linear signal and the digitized first non-linear interference sample; and
   the up-converting includes converting the digitized linear low-frequency canceling signal to an analog signal and frequency up-converting the analog signal to produce the linear RF canceling signal.

5. The method of claim 1, wherein the second canceling includes:
   deriving a linear RF canceling signal from the linear signal and the second non-linear interference sample so that the linear RF canceling signal is substantially equal in amplitude and opposite in phase from the linear interference in the received RF interference; and
   summing the received RF interference with the linear RF canceling signal to substantially cancel the linear interference from the received RF interference.

6. The method of claim 5, wherein the RF interference and the linear RF canceling signal are in a high-frequency band and the linear signal is in a low-frequency band below the high-frequency band, the summing produces an RF version of the second non-linear interference sample, and the second canceling further includes:
   down-converting to the low-frequency band the RF version of the second non-linear interference sample, to produce the second non-linear interference sample;
   generating in the low-frequency band a linear low-frequency canceling signal from the linear signal and the second non-linear interference sample; and
   up-converting the linear low-frequency canceling signal to the linear RF canceling signal.

7. The method of claim 6, wherein the linear signal is a digitized linear signal:
- the down-converting includes frequency down-converting to the low-frequency band and then digitizing the RF version of the second non-linear interference sample, to produce the second non-linear interference sample as a digitized, non-linear interference sample in the low-frequency band; and
- the generating includes digitally generating the linear low-frequency canceling signal as a digitized linear low-frequency canceling signal based on the digitized linear signal and the digitized second non-linear interference sample; and
- the up-converting includes converting the digitized linear low-frequency canceling signal to an analog signal and frequency up-converting the analog signal to produce the linear RF canceling signal.

8. The method of claim 1, wherein:
- the first canceling includes producing the first non-linear interference sample at baseband or an intermediate frequency band below an RF frequency band of the RF interference;
- the second canceling includes producing the second non-linear interference sample at baseband or an intermediate frequency band below an RF frequency band of the RF interference; and
- the third canceling includes canceling the non-linear interference at baseband or an intermediate frequency band below an RF frequency band of the RF interference, to produce the receive signal.

9. The method of claim 1, wherein:
- the linear interference has a linear interference power and the non-linear interference has a non-linear interference power that is at least one order of magnitude less than the linear interference power.

10. The method of claim 1, wherein:
- the first and second canceling each includes processing signals in an RF domain and processing signals in a digital domain; and
- the third canceling includes processing signals only in the digital domain.

11. An apparatus, comprising:
- a first canceler to:
- sample radio frequency (RF) interference generated from a linear signal using a non-linear process, the RF interference including relatively narrow-band linear interference and relatively wideband non-linear interference;
- receive from a transmitter the linear signal; and
- cancel in an analog domain the narrow-band linear interference from the sampled RF interference, wherein the first canceler includes a summer to sum the sampled RF interference with a linear RF canceling signal that is based on the linear signal, to produce a wideband first non-linear interference sample in a digital domain;
- a second canceler to:
- receive an amplitude scaled, time shifted version of the RF interference;
- receive from the transmitter the linear signal; and
- cancel in the analog domain the narrow-band linear interference from the received RF interference based on the linear signal to produce a wideband second non-linear interference sample in the digital domain; and
- a third canceler to cancel in the digital domain the wideband non-linear interference from the wideband second non-linear interference sample using the wideband first non-linear interference sample, to produce a receive signal that is substantially free of the non-linear interference and the linear interference.

12. The apparatus of claim 11, wherein the first canceler includes:
- components to derive the linear RF canceling signal from the linear signal and the first non-linear interference sample so that the linear RF canceling signal is substantially equal in amplitude and opposite in phase from the linear interference in the RF interference sample,
- wherein the summer is configured to substantially cancel the linear interference from the sampled RF interference.

13. The apparatus of claim 12, wherein the RF interference and the linear RF canceling signal are in a high-frequency band and the linear signal is in a low-frequency band below the high-frequency band, the summer is configured to produce an RF version of the first non-linear interference sample, and the first canceler components include:
- a down-converter to down-convert to the low-frequency band the RF version of the non-linear interference sample to produce the first non-linear interference sample;
- a canceler processor to generate in the low-frequency band a linear low-frequency canceling signal from the linear signal and the first non-linear interference sample; and
- an up-converter to up-convert the linear low-frequency canceling signal to the linear RF canceling signal.

14. The apparatus of claim 13, wherein the linear signal is a digitized linear signal, and wherein:
- the down-converter includes a mixer to frequency down-convert, and a digitizer to digitize, the RF version of the first non-linear interference sample, to produce the first non-linear interference sample as a digitized, non-linear interference sample in the low-frequency band;
- the canceler processor includes a digital processor to digitally generate the linear low-frequency canceling signal as a digitized linear low-frequency canceling signal based on the digitized linear signal and the digitized first non-linear interference sample; and
- the up-converter includes an analog-to-digital converter (ADC) to convert the digitized linear low-frequency canceling signal to an analog signal and a mixer to frequency up-convert the analog signal to produce the linear RF canceling signal.

15. The apparatus of claim 11, wherein the second canceler includes:
- components to derive a linear RF canceling signal from the linear signal and the second non-linear interference sample so that the linear RF canceling signal is substantially equal in amplitude and opposite in phase from the linear interference in the received RF interference; and
- a summer to sum the received RF interference with the linear RF canceling signal to substantially cancel the linear interference from the received RF interference.

16. The apparatus of claim 15, wherein the RF interference and the linear RF canceling signal are in a high-frequency band and the linear signal is in a low-frequency band below the high-frequency band, the summer produces an RF version of the second non-linear interference sample, and the second canceler components include:

a down-converter to down-convert to the low-frequency band the RF version of the second non-linear interference sample, to produce the second non-linear interference sample;

a canceler processor to generate in the low-frequency band a linear low-frequency canceling signal from the linear signal and the second non-linear interference sample; and an up-converter to up-convert the linear low-frequency canceling signal to the linear RF canceling signal.

17. The apparatus of claim 16, wherein the linear signal is a digitized linear signal:

the down-converter includes a mixer to frequency down-convert, and a digitizer to digitize, the RF version of the second non-linear interference sample, to produce the second non-linear interference sample as a digitized, non-linear interference sample in the low-frequency band;

the canceler processor includes a digital processor to digitally generate the linear low-frequency canceling signal as a digitized linear low-frequency canceling signal based on the digitized linear signal and the digitized second non-linear interference sample; and the up-converter includes an analog-to-digital converter (ADC) to convert the digitized linear low-frequency canceling signal to an analog signal and a mixer to frequency up-convert the analog signal to produce the linear RF canceling signal.

18. The apparatus of claim 11, wherein:

the first canceler is configured to produce the first non-linear interference sample at baseband or an intermediate frequency band below an RF frequency band of the RF interference;

the second canceler is configured to produce the second non-linear interference sample at baseband or an intermediate frequency band below an RF frequency band of the RF interference; and the third canceler is configured to cancel the non-linear interference at baseband or an intermediate frequency band below an RF frequency band of the RF interference, to produce the receive signal at baseband.

19. The apparatus of claim 11, wherein:

the linear interference has a linear interference power and the non-linear interference has a non-linear interference power that is at least one order of magnitude less than the linear interference power.

20. A system, comprising:

a transmitter to transmit radio frequency (RF) interference generated from a linear signal using a non-linear processes, the RF interference including relatively narrow-band linear interference and relatively wideband non-linear interference;

a receiver to receive a portion of the transmitted interference; and a multi-tier canceler coupled with the receiver and the transmitter, including:

a first canceler to sample the generated interference including linear interference and non-linear interference, receive the linear signal, and cancel in an analog domain the narrow-band linear interference from the sampled RF interference, wherein the first canceler includes a summer to sum the sampled RF interference with a linear RF canceling signal that is based on the linear signal, to produce a wideband first non-linear interference sample in a digital domain;

a second canceler to receive the linear signal and an amplitude scaled, time shifted version of the RF interference, and cancel in the analog domain the narrow-band linear interference from the received RF interference based on the linear signal to produce a wideband second non-linear interference sample in the digital domain; and a third canceler to cancel in the digital domain the wideband non-linear interference from the wideband second non-linear interference sample using the wideband first non-linear interference sample, to produce a receive signal that is substantially free of the non-linear interference and the linear interference.

21. The system of claim 20, wherein:

the first canceler is configured to produce the first non-linear interference sample at baseband or an intermediate frequency band below an RF frequency band of the RF interference;

the second canceler is configured to produce the second non-linear interference sample at baseband or an intermediate frequency band below an RF frequency band of the RF interference; and the third canceler is configured to cancel the non-linear interference at baseband or an intermediate frequency band below an RF frequency band of the RF interference, to produce the receive signal at baseband.

22. The system of claim 20, wherein:

the linear interference has a linear interference power and the non-linear interference has a non-linear interference power that is at least one order of magnitude less than the linear interference power.

\* \* \* \* \*